F. DYER.
HAND CORN PLANTER.
No. 182,751.  Patented Oct. 3, 1876.
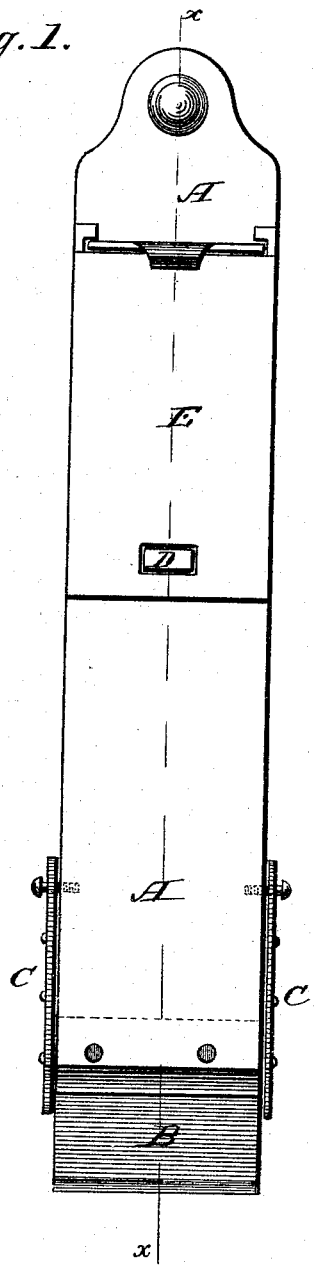
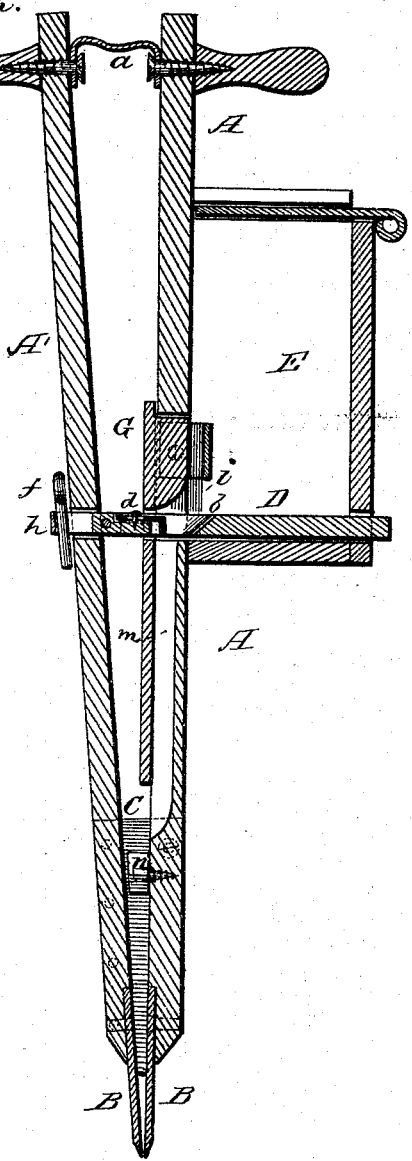
Witnesses:
P. C. Dieterich
F. H. Duffy
Inventor:
Fayette Dyer
Per C. H. Watson & Co. Attorneys.

UNITED STATES PATENT OFFICE.

FAYETTE DYER, OF ROCK FALLS, ILLINOIS.

IMPROVEMENT IN HAND CORN-PLANTERS.

Specification forming part of Letters Patent No. 182,751, dated October 3, 1876; application filed February 14, 1876.

*To all whom it may concern:*

Be it known that I, FAYETTE DYER, of Rock Falls, in the county of Whitesides and State of Illinois, have invented certain new and useful Improvements in Hand Corn-Planters; and I do hereby declare that the following is a full, clear, and exact description thereof, which will enable others skilled in the art to which it appertains to make and use the same, reference being had to the accompanying drawing, and to the letters of reference marked thereon, which form a part of this specification.

The nature of my invention consists in the construction and arrangement of a hand corn-planter, as will be hereinafter more fully set forth.

In the annexed drawing, Figure 1 is a side elevation. Fig. 2 is a vertical section on line $x$ $x$, Fig. 1, and Fig. 3 is a top view of the slide.

A A' represent two bars or blades provided with suitable handles at their upper ends and with the plates B B at their lower ends. These bars are connected near their lower ends by means of side flanges C C permanently secured to the edges of the bar A', and pivoted to the edges of the bar A, thus allowing the bar A' to turn, so as to open or close the foot of the planter formed by the plates B B. The upper ends of the bars A A' are connected by means of a strap, $a$, which limits the distance the said upper ends of the bars may be separated, and prevents any injury to the foot-plates B B which would result by opening the bars too wide at the top. On the outside of the bar A is secured the seed-box E, in the bottom of which is the dropping slide D, provided with the aperture $b$ and slide $d$ for regulating the size of said aperture, and thus regulate the amount of corn to be deposited. At the outer end of the slide D is fastened a flexible loop, $h$, which is passed through a slot in the bar A' and held by a pin, $f$, passed through the loop on the outside of said bar. By this means the dropping-slide can easily be attached and detached, when required, and said connection being made flexible no strain can be put on the slide in the operation of the machine that would be likely to bend or otherwise injure the same.

Above the slide D in the bar A is inserted a block, G, on the inner side of which is fastened a brush, $i$, for preventing more than the desired amount of corn to pass out of the corn-box. The corn passes from the slide D through a passage, $m$, to the foot of the planter, and in said foot, at the bottom of the passage, is a diamond-shaped lug or projection, $n$, which acts as a scatterer to distribute the grains in the foot of the planter, thereby preventing them from coming down in the hill in a heap, but more or less separated.

The planter thus constructed is simple in construction, cheap to manufacture, and yet durable and not liable to get out of order.

Having thus fully described my invention, what I claim as new, and desire to secure by Letters Patent, is—

The part A, provided with the block G and the passage $m$, in combination with the slide D, part A', and flexible loop $h$, and pin $f$, all substantially as and for the purpose specified.

In testimony that I claim the foregoing as my own invention I affix my signature in presence of two witnesses.

FAYETTE DYER.

Witnesses:
J. B. RALPH,
L. E. TUTTLE.